C. J. WILLS.
DETACHABLE AUTOMOBILE STEERING WHEEL.
APPLICATION FILED NOV. 29, 1920.
1,400,121. Patented Dec. 13, 1921.
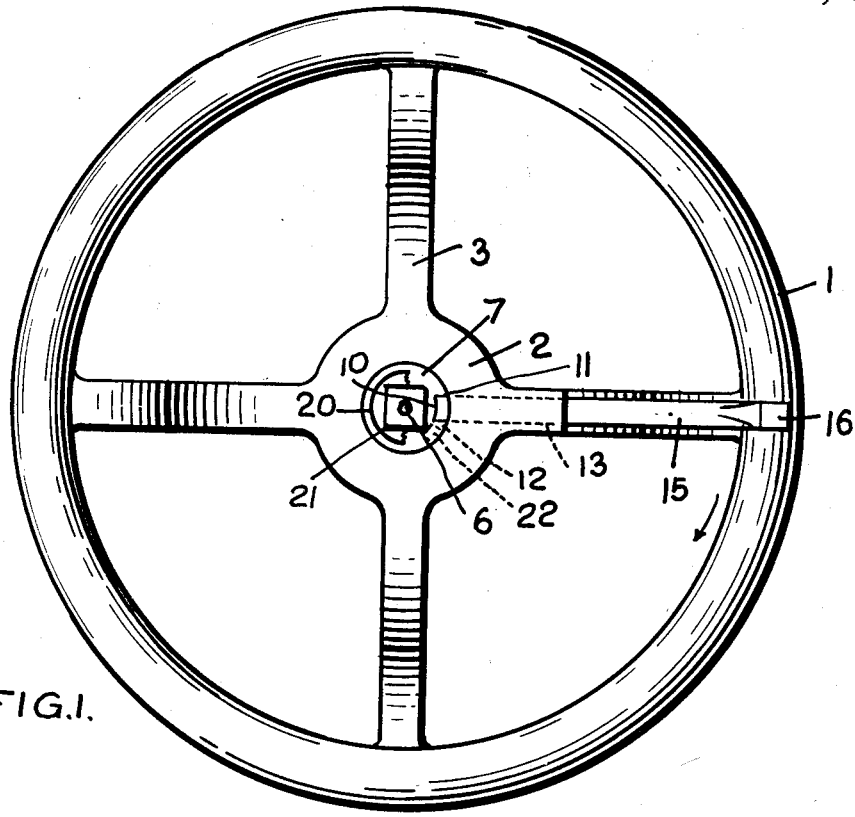
FIG.1.
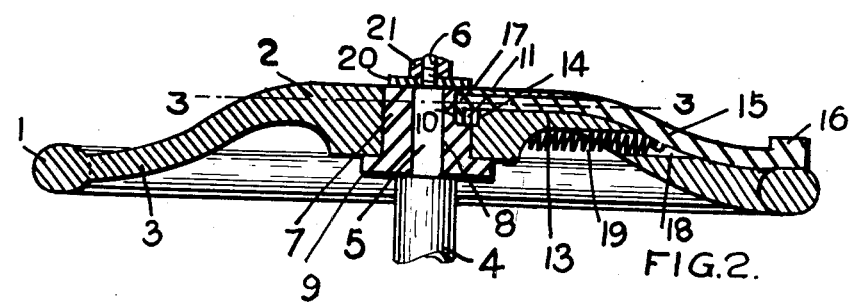
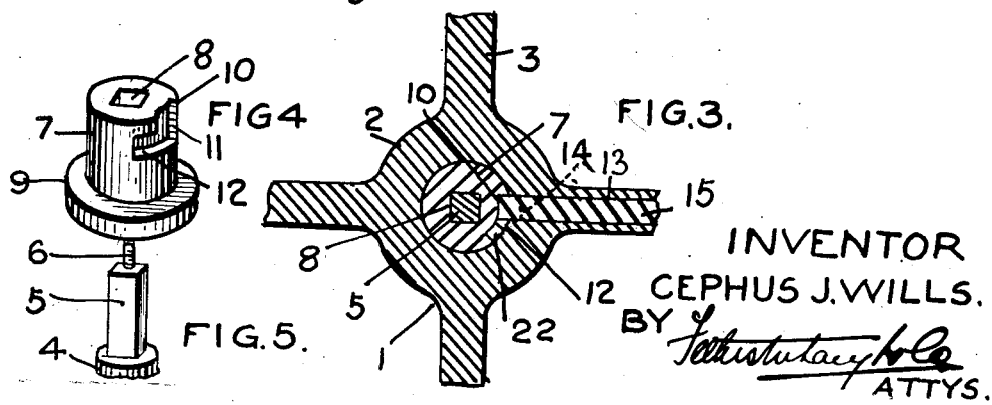
INVENTOR
CEPHUS J. WILLS.
BY
ATTYS.

UNITED STATES PATENT OFFICE.

CEPHAS JOHN WILLS, OF TORONTO, ONTARIO, CANADA, ASSIGNOR OF ONE-HALF TO EDGAR JAMES WILLS, OF TORONTO, ONTARIO, CANADA.

DETACHABLE AUTOMOBILE STEERING-WHEEL.

1,400,121.  Specification of Letters Patent.  Patented Dec. 13, 1921.

Application filed November 29, 1920. Serial No. 426,975.

*To all whom it may concern:*

Be it known that I, CEPHAS JOHN WILLS, of the city of Toronto, in the county of York, in the Province of Ontario, Canada, have invented certain new and useful Improvements in Detachable Automobile Steering-Wheels, of which the following is a specification.

My invention relates to improvements in detachable automobile steering wheels and the object of the invention is to devise means whereby the steering wheel can be detached from the steering shaft so as to render the shaft inoperable and prevent any unauthorized person from stealing the car, this object being effected by manual means by which the operator can readily attach or detach the steering wheel from the steering shaft without letting go his grip upon the steering wheel and it consists essentially of the following arrangement and construction of parts as hereinafter more particularly explained.

Figure 1 is a plan view of the steering wheel of an automobile showing my means for detachably connecting the wheel to the steering shaft.

Fig. 2 is a cross sectional view through Fig. 1.

Fig. 3 is a plan sectional view on line 3—3, Fig. 2.

Fig. 4 is a perspective detail of the keeper member secured to the upper end of the steering shaft.

Fig. 5 is a perspective detail of the upper end of the steering shaft and upon which the keeper member is carried.

In the drawings like characters of reference indicate the corresponding parts in each figure.

1 indicates the steering wheel of an automobile, 2 the central annular hub and 3 the spokes. 4 is a steering shaft to which the wheel 1 is detachably connected by means which I will now describe.

5 is a squared portion formed at the upper end of the steering shaft 4. 6 is a threaded stem extending upwardly from the end of the squared portion 5 and located centrally thereof. 7 is a keeper member provided with a central squared orifice 8 into which the squared portion 5 of the steering shaft 4 fits. The keeper member 7 is cylindrical and provided at its lower end with an annular flange 9 for a purpose which will hereinafter appear.

10 is a recess which is L or bayonet-shaped, the vertical arm 11 of such recess extending to the upper end face of the keeper member 7. From the lower end of the vertical portion 11 extends a circumferential portion 12. The wheel 1 as before stated is provided with a central annular hub 2 from which extends spokes 3. One of such spokes is provided with an orifice 13 extending longitudinally of the inner portion of the spoke and through the central annular hub 2 terminating in a recess 14 which extends downward from the lower edge of the orifice 13 as clearly indicated in Fig. 2. 15 is a locking plunger slidable within the orifice 13, the plunger conforming to the shape of the spoke and extending in proximity to the outer edge of the wheel 1. 16 is a slightly upwardly projecting portion formed at the outer end of the locking plunger 15. The inner end of the plunger 15 is provided with a head portion 17 which may be formed integral or separately connected to the locking plunger by suitable means. The head 17 normally fits within the vertical portion 11 of the recess 10 of the keeper member 7 and when the locking plunger 15 is withdrawn the head 17 fits within the recess 14 so as to be clear of the keeper member 7. 18 is an orifice which is also formed in the spoke 3 hereinbefore referred to. 19 is a tension spring extending through the orifice 18 and connected at one end to the locking plunger 15 and at the opposite to the hub 2 of the wheel 1. 20 and 21 are respectively a washer and nut, the washer bearing against the upper end of the keeper member around the stem 6, the nut 21 being screwed upon such stem against the washer. 22 is a projection formed in the interior of hub 2. When the parts are in their engaged position the projection 22 extends into the portion 12 of the recess 10.

When it is desired to remove the steering wheel 1 from the steering shaft 4, the thumb of the operator's hand which grips the right hand side of the wheel is pressed against the projection 16 so as to move the locking plunger 15 against the tension of the spring 19 thereby withdrawing the head 17 from the portions 11 of the recess 10 so that it fits within the recess 14 and out of vertical alinement with the outer periphery of the keeper 7 and washer 20.

When this operation is complete the steering wheel is given a turning movement by the hands of the operator so as to carry the projection 22 circumferentially into the portion 11 of the recess 10. The wheel is then pulled in a direction longitudinally of the steering shaft so that the projection 22 passes longitudinally of the recessed portion 11 of the slot 10 thereby detaching the wheel from the steering shaft. The wheel 1 when detached as above described may be either carried by the operator or locked in a suitable receptacle in the automobile.

When it is desired to re-attach the steering wheel to the steering shaft, the plunger 15 is again withdrawn in the manner above described. The open center of the hub 2 is then passed over the keeper member so that the hub rests upon the flange 9, the lug 22 passing downward to the lower end of the recess portion 11. The wheel is then given a turning movement so as to carry the projection 22 into the recess portion 12. The locking plunger 15 is then released, such plunger being carried by the spring 19 inward so that the head 17 thereof enters the vertical portion 11 of the recess 10.

From this description it will be seen that I have devised very simple means whereby the steering wheel can be readily removed with practically no effort on the part of the operator and without the operator having to let go of the steering wheel, thereby preventing the operation of the steering mechanism and the danger of the car being stolen.

What I claim as my invention is:

1. The combination with the steering shaft and steering wheel, of a keeper portion carried by the steering shaft and provided with a keeper recess extending inwardly from the end of the shaft and circumferentially, an engaging projection carried by the steering wheel adapted to enter the recess so as to be carried longitudinally and circumferentially of the shaft, and a locking plunger carried by the wheel adapted to fit the recess and to be withdrawn by the thumb of the operator holding the steering wheel.

2. The combination with a steering shaft and steering wheel having a central annular hub, of a projection extending inwardly from the hub, a keeper member secured to the shaft provided with a bayonet recess extending downward from the upper end and into engagement with which the wheel projection aforesaid is carried by a downward and circumferential movement, and withdrawable means for preventing the return movement of such projection.

3. The combination with a steering shaft and steering wheel having a central annular hub, of a projection extending inwardly from the hub, a keeper member secured to the shaft provided with a bayonet recess extending downward from the upper end and into engagement with the longitudinal portion of which the wheel projection aforesaid is carried by a downward and circumferential movement, and a spring held locking plunger carried in radial position upon the wheel and extending at its inner end into the vertical portion of the bayonet recess and at its outer end in proximity to the wheel periphery.

4. The combination with the steering shaft having a reduced squared upper end, a cylindrical keeper member having a squared orifice fitting the squared upper end of the steering shaft and having an annular flange at its lower end, a steering wheel having an annular hub adapted to fit the cylindrical keeper member and rest upon the annular flange, an interengaging connection between the wheel and keeper member, and means operated by the operator for releasing the interengaging connection to permit the removal of the steering wheel from the keeper member.

5. The combination with the steering shaft, of a cylindrical keeper member secured to the upper end of the steering shaft and provided with an annular flange at its upper end and having a peripheral bayonet recess extending inwardly from the upper end of the keeper member, and a steering wheel having an internal projection adapted to engage the bayonet recess, and a spring held locking plunger engaging the vertical portion of the recess when the projection is in the engaged position and adapted to be operated by the thumb of the operator when his hand is in the gripping position upon the wheel.

CEPHAS JOHN WILLS.